(12) United States Patent
Bonacini

(10) Patent No.: US 8,424,584 B2
(45) Date of Patent: Apr. 23, 2013

(54) UNIT FOR BEADING TIRES IN TIRE CHANGING MACHINES OR THE LIKE

(75) Inventor: Maurizio Bonacini, Correggio (IT)

(73) Assignee: Giuliano Group S.p.A., Correggio (RE) (IT)

( * ) Notice: Subject to any disclaimer, the term of this patent is extended or adjusted under 35 U.S.C. 154(b) by 259 days.

(21) Appl. No.: 12/803,654

(22) Filed: Jul. 1, 2010

(65) Prior Publication Data

US 2011/0030904 A1 Feb. 10, 2011

(30) Foreign Application Priority Data

Aug. 7, 2009 (IT) .............................. MO2009A0209

(51) Int. Cl.
*B60C 25/138* (2006.01)

(52) U.S. Cl.
USPC ......................................... 157/1.17; 157/1.24

(58) Field of Classification Search .................. 157/1.17, 157/1.24
See application file for complete search history.

(56) References Cited

U.S. PATENT DOCUMENTS

| 5,226,465 | A | 7/1993 | Schoen et al. | |
|---|---|---|---|---|
| 6,422,285 | B1 * | 7/2002 | Gonzaga | 157/1.24 |
| 6,527,032 | B2 * | 3/2003 | Corghi | 157/1.28 |
| 6,588,478 | B2 * | 7/2003 | Vignoli | 157/1.28 |
| 7,341,090 | B2 * | 3/2008 | Gonzaga | 157/1.17 |
| 7,896,054 | B2 * | 3/2011 | Bonacini | 157/1.24 |
| 2006/0027334 | A1 * | 2/2006 | Boni | 157/1.24 |
| 2007/0000617 | A1 * | 1/2007 | Gonzaga | 157/1.17 |
| 2008/0060766 | A1 * | 3/2008 | Bonacini | 157/1.24 |
| 2008/0060767 | A1 * | 3/2008 | Bonacini | 157/1.24 |
| 2008/0173408 | A1 * | 7/2008 | Vignoli | 157/1.24 |
| 2009/0266494 | A1 * | 10/2009 | Sotgiu | 157/1.24 |

FOREIGN PATENT DOCUMENTS

| EP | 1 623 850 | 2/2006 |
|---|---|---|
| EP | 1 897 708 | 3/2008 |
| EP | 2 062 752 | 5/2009 |

OTHER PUBLICATIONS

European Search Report dated Oct. 27, 2010 in European Patent Application No. EP 10 17 1628.

* cited by examiner

*Primary Examiner* — David B Thomas
(74) *Attorney, Agent, or Firm* — Collard & Roe, P.C.

(57) ABSTRACT

The unit for beading tires in tire changing machines or the like includes a bearing structure associable with a tire changing machine or the like, a supporting element associated with the bearing structure and moving with respect to the rim of a wheel mounted on the tire changing machine, a first actuator arrangement for moving the supporting element on the bearing structure, a beading tool associated with a free extremity of the supporting element, and a second actuator arrangement and a transformation arrangement for transforming the movement generated by the second actuator arrangement in the translation movement of the beading tool along a substantially curvilinear trajectory between a first extreme position, in which the beading tool is substantially retracted with respect to the rim, and a second extreme position, in which the beading tool is substantially closer with respect to the rim.

16 Claims, 8 Drawing Sheets

UNIT FOR BEADING TIRES IN TIRE CHANGING MACHINES OR THE LIKE

CROSS REFERENCE TO RELATED APPLICATIONS

Applicant claims priority under 35 U.S.C. §119 of Italian Patent Application No. MO2009A000209 filed on Aug. 7, 2009.

BACKGROUND OF THE INVENTION

1. Field of the Invention

The present invention relates to a unit for beading tires usable, in particular, in tire changing machines or the like.

2. Description of the Related Art

As is known, so-called "tire changing" machines are commonly used inside workshops to remove and fit motor-vehicle wheel tires.

Such tire changing machines generally comprise a frame suitable for supporting a grip and start of rotation part of the rim of a wheel on/from which a tire has to be fitted/removed, and one or more tools for fitting and removing the tire itself It is also known that, before being able to completely remove a tire from the rim, the two beads have to be detached from the respective bead retainer edges positioned along the perimeter of the rim and which delimit the housing seat of the tire itself.

This operation is performed by means of a special beading unit, normally fitted to the tire changing machine itself.

This beading unit commonly comprises a horizontal arm, supported sliding vertically, at one extremity, by a bearing structure associated with the frame of the tire changing machine and having, at the opposite extremity, a special beading tool, of the type of a beading disc or the like.

In particular, the bearing structure commonly comprises a supporting upright associated with the frame of the tire changing machine and a carriage sliding along such upright and suitable for supporting the horizontal arm with the beading disc.

In a first known solution, the horizontal arm is of the telescopic type and can be extended or retracted longitudinally by means of the operation of one or more actuators, so as to allow the movement of the beading disc along a rectilinear direction and towards the rotation axis of the wheel, for the correct positioning of the beading tool on one side of the tire to be beaded, in proximity of one of the edges of the rim.

In point of fact, during use, the horizontal arm is positioned above the wheel, arranged horizontally and anchored to the grip part of the tire changing machine, and is extended or retracted until it reaches the correct positioning of the beading disc on one side of the tire to be beaded, in proximity of one of the edges of the rim.

Subsequently, the sliding carriage is moved downwards and, consequently, the beading disc presses on the tire and causes the detachment of a section of the bead from the rim edge.

To allow a correct detachment of such section of the bead from the rim, the further forward movement is known, after the lowering of the arm, of the beading disc along a rectilinear direction and towards the rotation axis of the wheel.

Such further forward movement of the roller is made through an additional extension of the telescopic element making up the horizontal arm, operated by a further actuator.

In particular, the further forward movement of the beading disc, together with the rotation of the wheel by means of the grip part, allow the detachment of the tire bead along the entire perimeter of the rim edge.

In a second known solution, the beading unit comprises a horizontal arm composed of a rod of predefined length fastened to the sliding carriage along the bearing structure.

The movement of the beading disc along a rectilinear direction, towards and away from the rotation axis of the wheel, is given by the movement of the bearing structure itself.

In point of fact, such bearing structure is fitted sliding along a rectilinear guide and is moved by operation of actuator means.

In this case, the further forward movement of the beading disc for the correct and complete detachment of the section of bead from the relative edge is carried out by means of a further movement of the bearing structure along the above-mentioned rectilinear direction, operated by a further actuator.

The known beading units described above are not, however, without drawbacks. In particular, the further forward movement of the beading tool towards the rim occurs along a rectilinear direction substantially at right angles to the tangential direction of rotation of the wheel on the grip part of the tire changing machine. This produces structural stresses on the tire that are not negligible and which are caused by the pressure of the tool itself and which, in some cases, can cause damage to the tire.

Furthermore, the beading tool must be moved by means of actuators with enough power to overcome the resistance opposed by the tire.

Consequently, the need to use high-power actuators affects in a far from negligible way the final cost of the beading unit.

SUMMARY OF THE INVENTION

The main aim of the present invention is to provide a unit for beading tires in tire changing machines or the like that allows more effective tire beading and restricts to the utmost the stresses on the tire due to the pressure of the beading tool.

Another object of the present invention is to provide a unit for beading tires in tire changing machines or the like which allows overcoming the mentioned drawbacks of the state of the art within the ambit of a simple, rational, easy, effective to use and low cost solution.

The above objects are achieved by the present unit for beading tires in tire changing machines or the like, comprising at least a bearing structure associable with a tire changing machine or the like, at least a supporting element associated with said bearing structure and moving with respect to the rim of a wheel mounted on said tire changing machine, a first actuator arrangement for moving said supporting element on said bearing structure, and at least a beading tool associated with a free extremity of said supporting element, characterized by the fact that it comprises a second actuator arrangement and a transformation arrangement for transforming the movement generated by said second actuator arrangement in the translation movement of said beading tool along a substantially curvilinear trajectory between a first extreme position, in which said beading tool is substantially retracted with respect to said rim, and a second extreme position, in which said beading tool is substantially closer with respect to said rim.

BRIEF DESCRIPTION OF THE DRAWINGS

Other characteristics and advantages of the present invention will become more evident from the description of a preferred, but not sole, embodiment of a unit for beading tires in tire changing machines or the like, illustrated purely as an example but not limited to the annexed drawings in which.

DETAILED DESCRIPTION OF PREFERRED EMBODIMENTS

Figure 1:
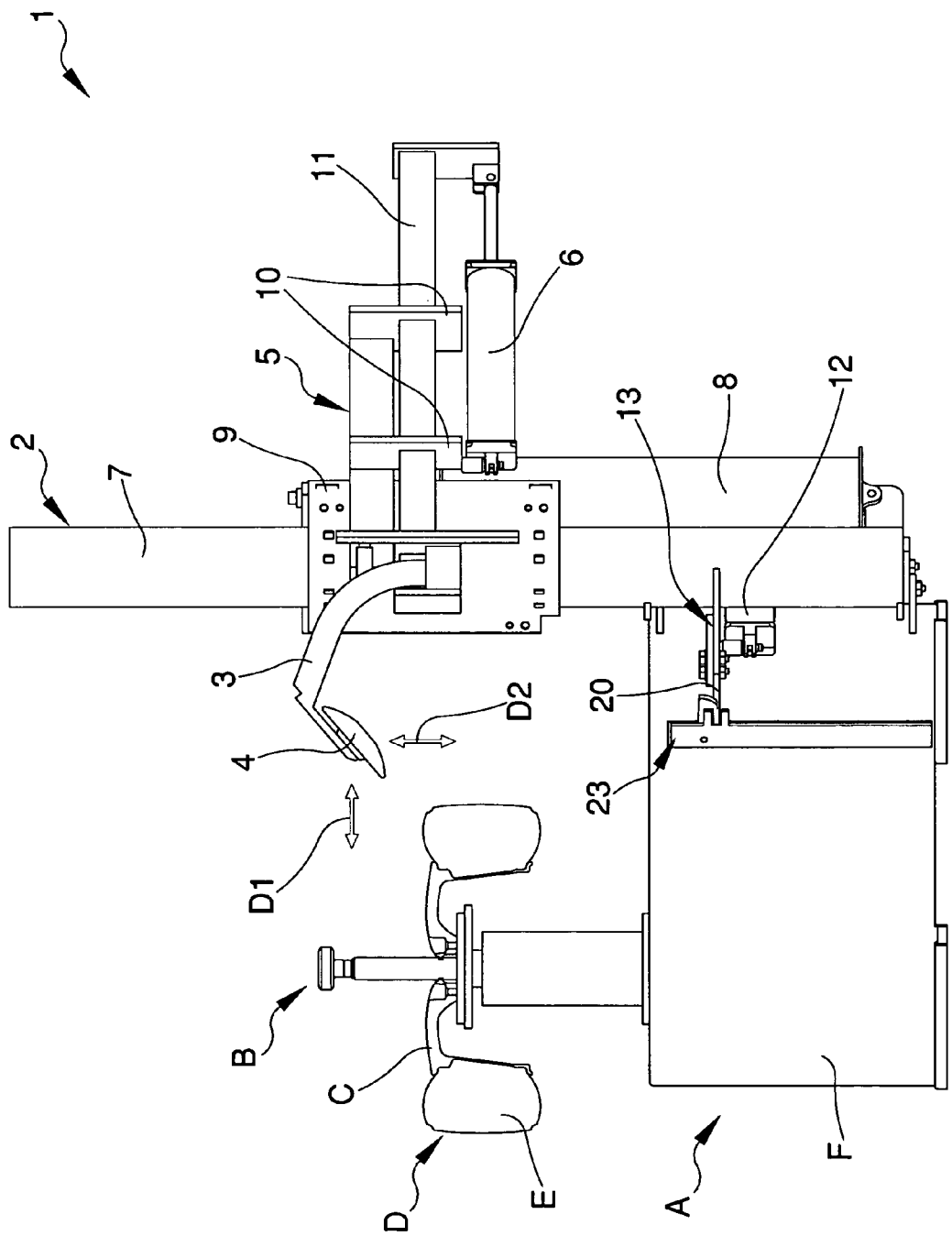
FIGS. 1 to 6 are side and plan views which show the use of the unit for beading tires according to the invention.

With particular reference to such figures, globally indicated by 1 is a unit for beading tires usable, in particular, in tire changing machines or the like.

The unit 1 comprises a bearing structure, generally indicated by the reference 2, associable with a tire changing machine A.

Usefully, the tire changing machine A can be of the type of a conventional tire changing machine, having a grip and rotation device B suitable for gripping and placing in rotation the rim C of a wheel D through the operation of a motor device.

A supporting element 3, consisting of a horizontal arm, is associated with the bearing structure 2 and is moving along a first direction D1 towards and away from the rim C and along a second direction D2 parallel to the rotation axis of the rim C through the operation of a first actuator arrangement.

With particular but not sole reference to the embodiment of the unit 1 shown in the illustrations, the wheel D is arranged horizontally on the grip and rotation device B, with vertical rotation axis.

Consequently, the first direction D1 and the second direction D2 of movement of the arm 3 correspond to a horizontal direction and to a vertical direction respectively.

A different arrangement of the grip and rotation device B cannot however be ruled out and, consequently, different embodiments of the unit 1 cannot be ruled out, in which the movement of the arm 3 occurs along directions different to those shown in the illustrations.

A beading tool 4, which in a preferred embodiment is made up of a beading disc of conventional type, is associated turnable with the free extremity of the arm 3 and can be used to remove the tire E from the rim C.

The unit 1 comprises a first guide arrangement 5 for the sliding of the arm 3 along the first direction D1.

The first actuator arrangement comprises a first linear actuator 6 associated with the arm 3 and which can be operated to slide the arm itself along said first guide arrangement 5.

The unit 1 also comprises a second guide arrangement 7 for the sliding of the arm 3 along the second direction D2.

The first actuator arrangement comprises a second linear actuator 8 which is associated with the arm 3 and which can be operated to slide the arm itself along said second guide arrangement 7.

With reference to the embodiment of the unit 1 shown in the illustrations, the second guide arrangement 7 is composed of an upright which is associated with the base F of the tire changing machine A.

The bearing structure 2 comprises a carriage 9 supporting the arm 3, sliding along the upright 7 by means of the operation of the second linear actuator 8. In particular, the second linear actuator 8 is fastened, at one extremity, to a lower portion of the upright 7 and is fastened, at the opposite extremity, to the carriage 9.

The second guide arrangement 7 comprises a pair of plates 10 associated integral with the carriage 9 and having respective sliding housing seats of a linear section 11 of the arm 3.

In particular, such housing seats on the plates 10 are made up of through openings in which the linear section 11 of the arm 3 is fitted sliding to measure. Usefully, the coupling between such housing seats on the plates 10 and the linear section 11 of the arm 3 is of the prismatic type, so as to prevent axial rotations of the arm itself.

Advantageously, the unit 1 comprises a second actuator arrangement 12 and a transformation arrangement, generally indicated by the reference 13, which is suitable for transforming the movement generated by the second actuator arrangement 12 into the rotary movement of the bearing structure 2, for the translation of the beading tool 4 along a substantially curvilinear trajectory.

In particular, such rotation of the bearing structure 2 results in the translation of the beading tool along a substantially curvilinear trajectory between a first extreme position, in which the beading tool 4 is substantially retracted from the rim C, and a second extreme position, in which the beading tool 4 is substantially nearer to the rim C.

In particular, this translation of the beading tool 4 is such as to favour its insertion underneath the edge of the rim C, during the operations of detachment of the bead of the tire E from the rim C.

Usefully, the transformation arrangement 13 is composed of a system of levers placed in between the bearing structure 2 and the tire changing machine A.

In particular, the system of levers 13 comprises a pair of first connecting rods 14, separated the one from the other, having a first extremity hinged to respective first brackets 15 fastened along the upright 7 and a second extremity hinged to respective second brackets 16 fastened to the base F of the tire changing machine A, around a first rotation axis A1.

The first connecting rods 14 are integral with one another by means of a vertical column 17 which, in particular, has its extremities fastened to respective protruding portions of the same first connecting rods 14.

The system of levers 13 also comprises a second connecting rod 18 having a first extremity hinged to a third bracket 19 fastened along the upright 7, between the first brackets 15, and a second extremity hinged to an anchoring element 20 that can be turned around a second rotation axis A2.

The second actuator arrangement 12 is composed of a third linear actuator which has a first extremity hinged to a pair of fourth brackets 21, fastened along the upright 7, and a second extremity which is hinged to the anchoring element 20 and can be turned around a third rotation axis A3.

In particular, the anchoring element 20 is made up of a plate of elongated shape having a first extremity hinged to a fifth bracket 27, fastened to the column 17 in correspondence to the above first rotation axis A1, and a second extremity with a protruding appendix 22, which can be fastened on to a locking device 23 fastened to the base F of the tire changing machine A.

Usefully, once the protruding appendix 22 has been freed from the locking device 23, the entire bearing structure 2 can be freely rotated around the first rotation axis A1.

In particular, this makes it possible to move the beading tool 4 away from the wheel D to allow, if need be, the replacement of the wheel D without changing the position of the beading tool itself.

In case of several tire removal and fitting operations performed in succession, if carried out on wheels D of the same size, no adjustment will this way be needed of the position of the beading tool 4 along the first direction D1.

Advantageously, the locking device 23 comprises a vertical rod 24, fastened to the base F, two rungs 25 which extend overhanging from the upper portion of the rod 24, separated from one another to define a housing for the protruding appendix 22, and a hook 26 positionable for gripping the protruding appendix 22 when this is between the rungs 25.

In particular, the hinging point of the second connecting rod 18 to the anchoring element 20, and therefore the second rotation axis A2, is defined in proximity of the protruding appendix 22.

The hinging point of the third linear actuator 12 to the anchoring element 20, and therefore the third rotation axis A3, is on the other hand defined between the hinging point of the second connecting rod 18 and the hinging point of the anchoring element 20 to the fifth bracket 27.

The operation of the unit 1 according to the invention is described here below. During the fitting of the wheel D on the grip and rotation device B of the tire changing machine A the arm 3 is distant, so as to allow the positioning of the wheel D by the operators (FIG. 1).

Figure 7:
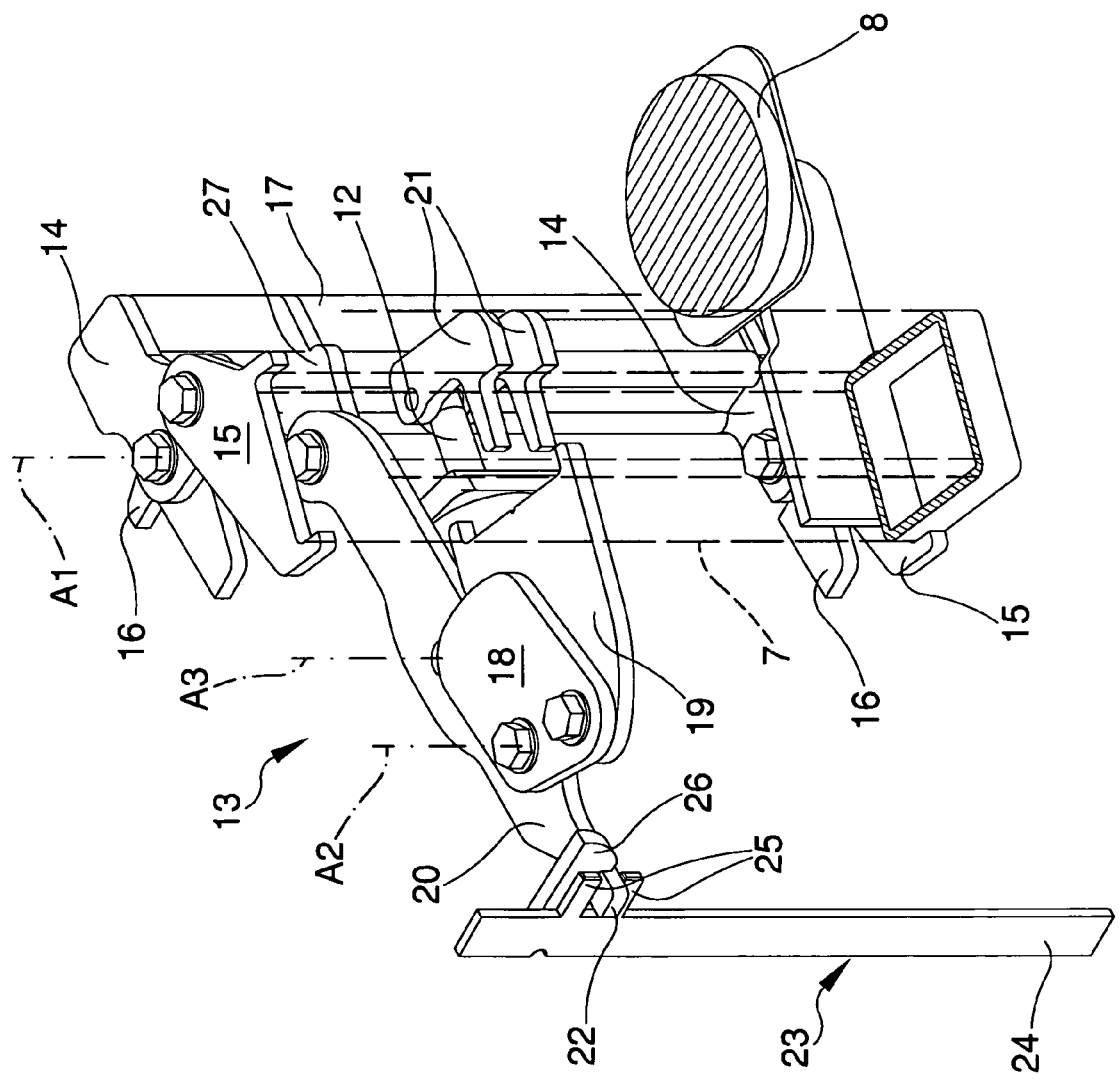
FIGS. 7 and 8 are partial views of a detail of the unit for beading tires according to the invention, concerning two different extreme positions of the beading tool.

Before performing the beading operation on the wheel D, the system of levers 13 and the third linear actuator 12 are configured so as to position the beading tool 4 in the predefined first extreme position, shown in the figures from 1 to 4 and, in detail, in FIG. 7.

Figure 2:
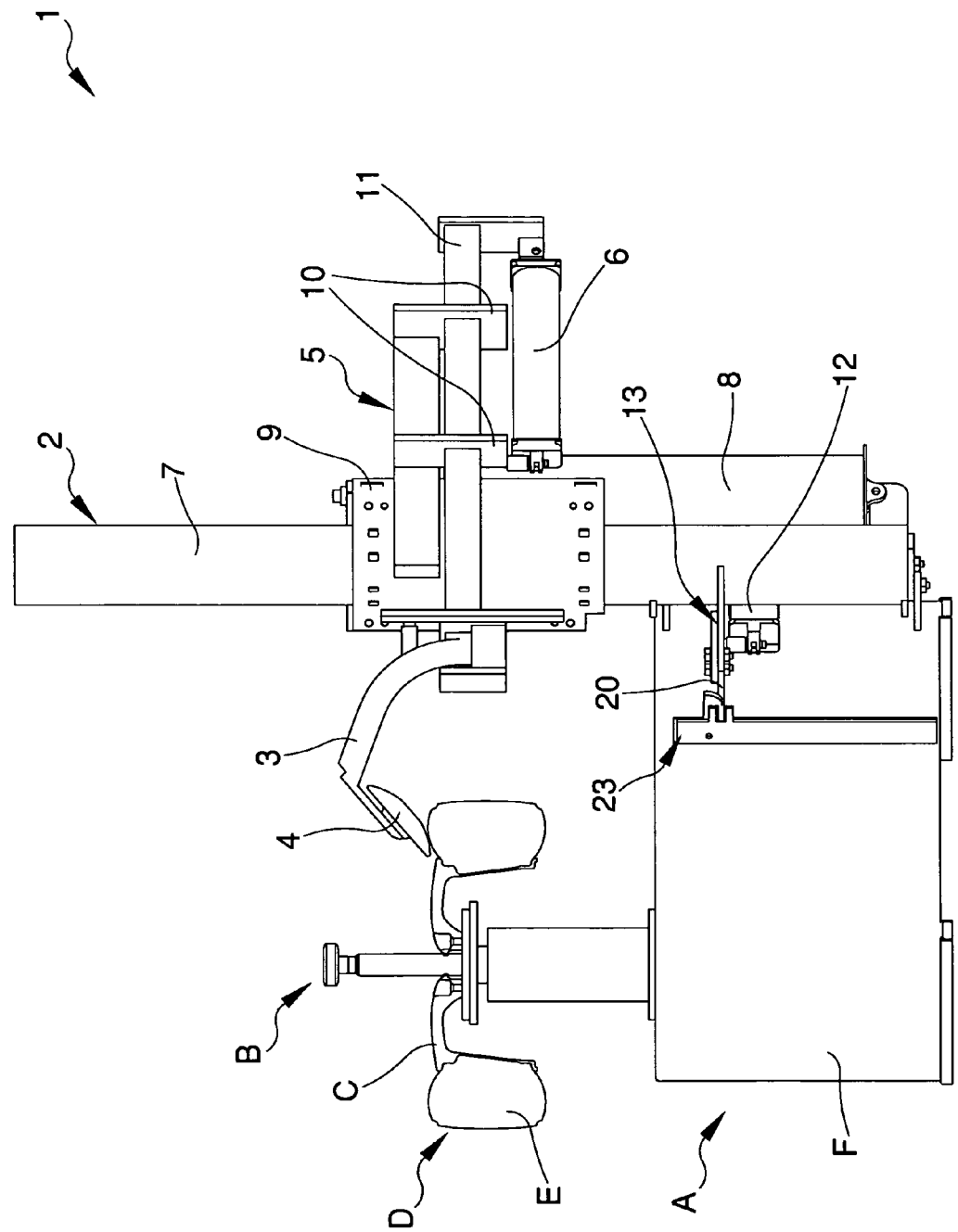

The arm 3 is moved along the first and the second direction D1 and D2 for the correct positioning of the beading tool 4 on the side of the tire E, in proximity of the edge of the rim C (FIG. 2).

In particular, the movement of the arm 3 along the first direction D1 is operated by the first linear actuator 6, which moves the linear section 11 of the arm 3 along the first guide arrangement 5.

The movement of the arm 3 along the second direction D2, on the other hand, is operated by the second linear actuator 8, which moves the carriage 9 along the upright 7.

Figure 3:
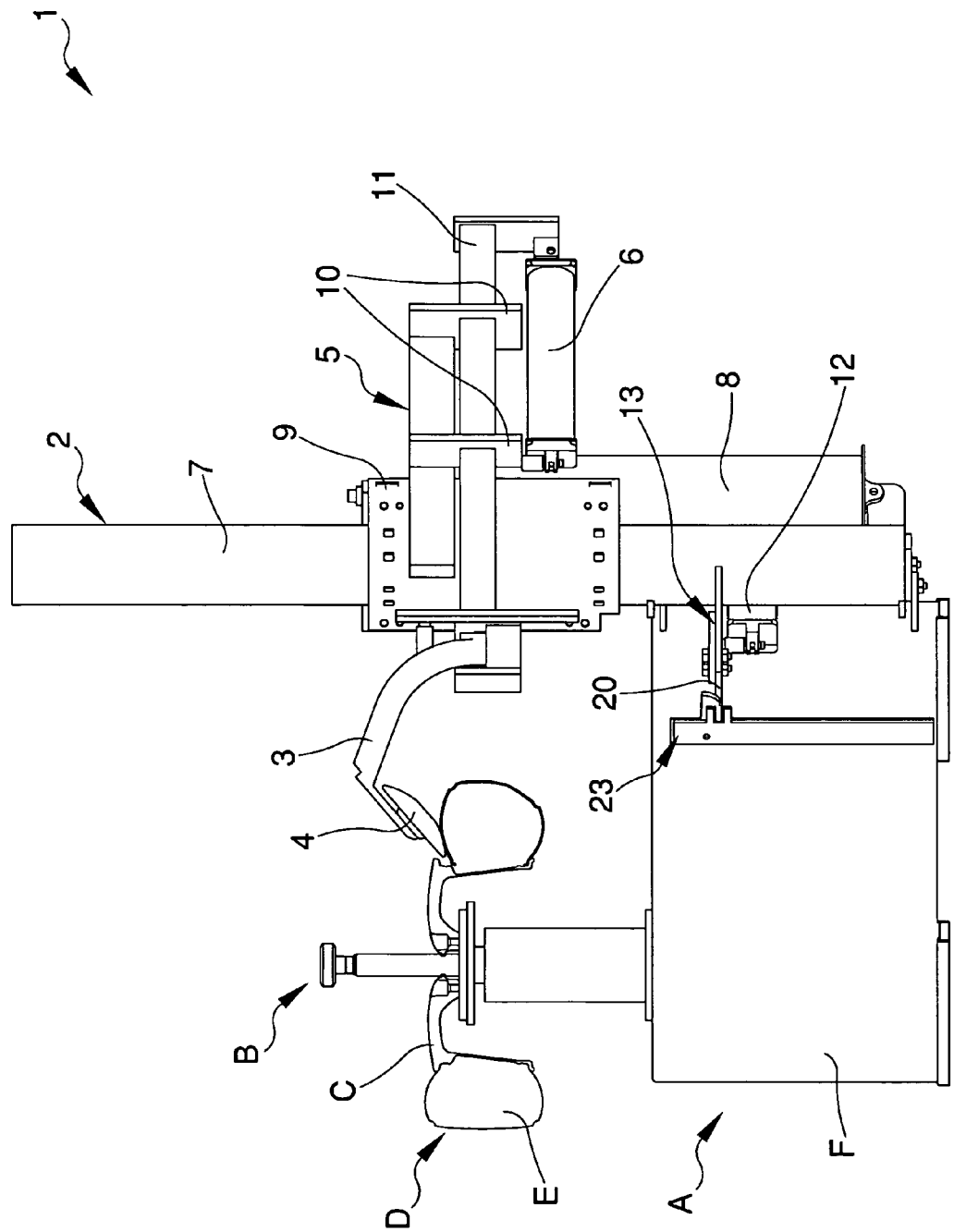
Figure 4:
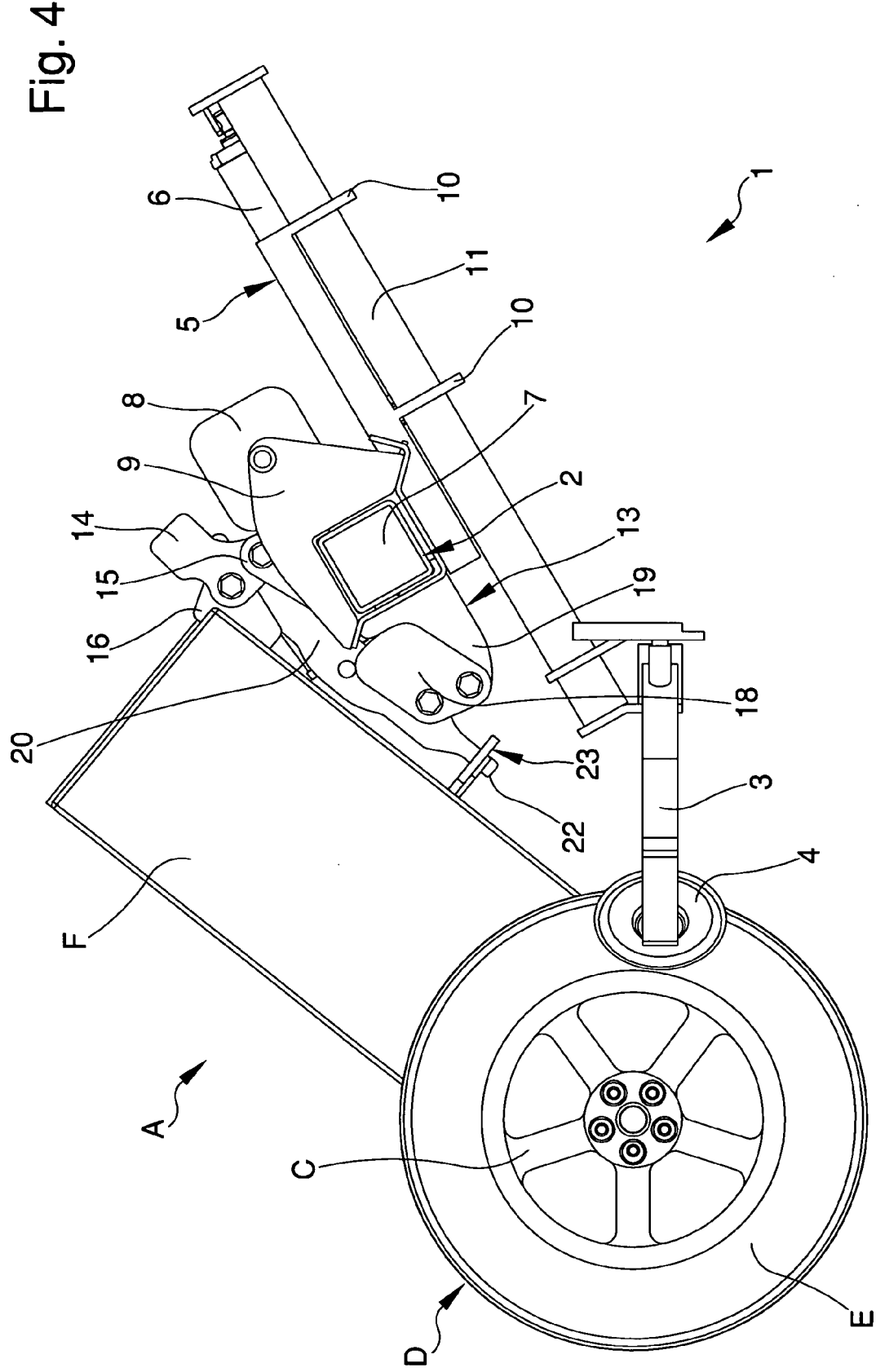

Subsequently, a further lowering of the carriage 9 pressurises the beading tool on the side of the tire, allowing the first detachment of a section of the bead of the tire E from the edge of the rim C (FIGS. 3 and 4).

Figure 5:
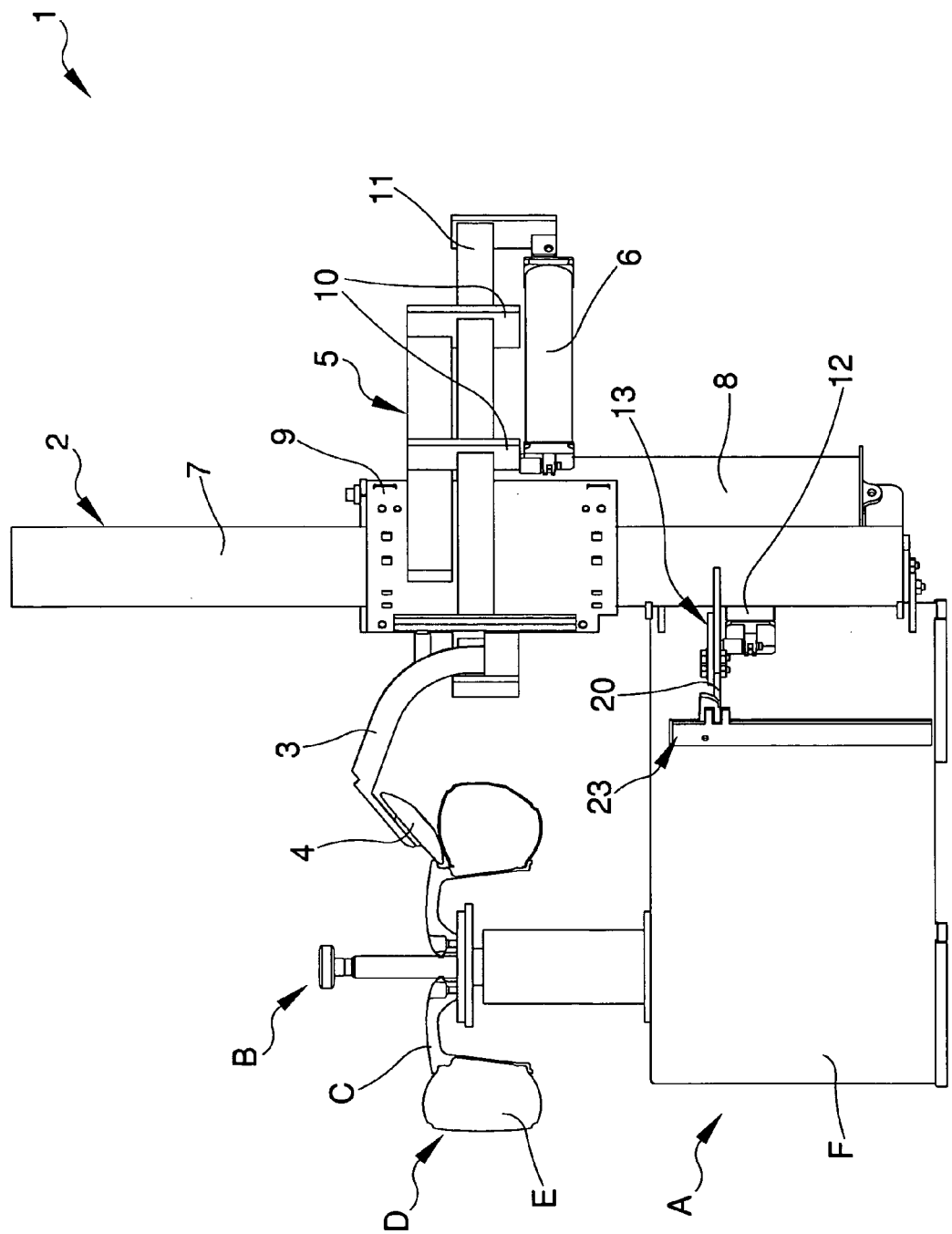
Figure 6:
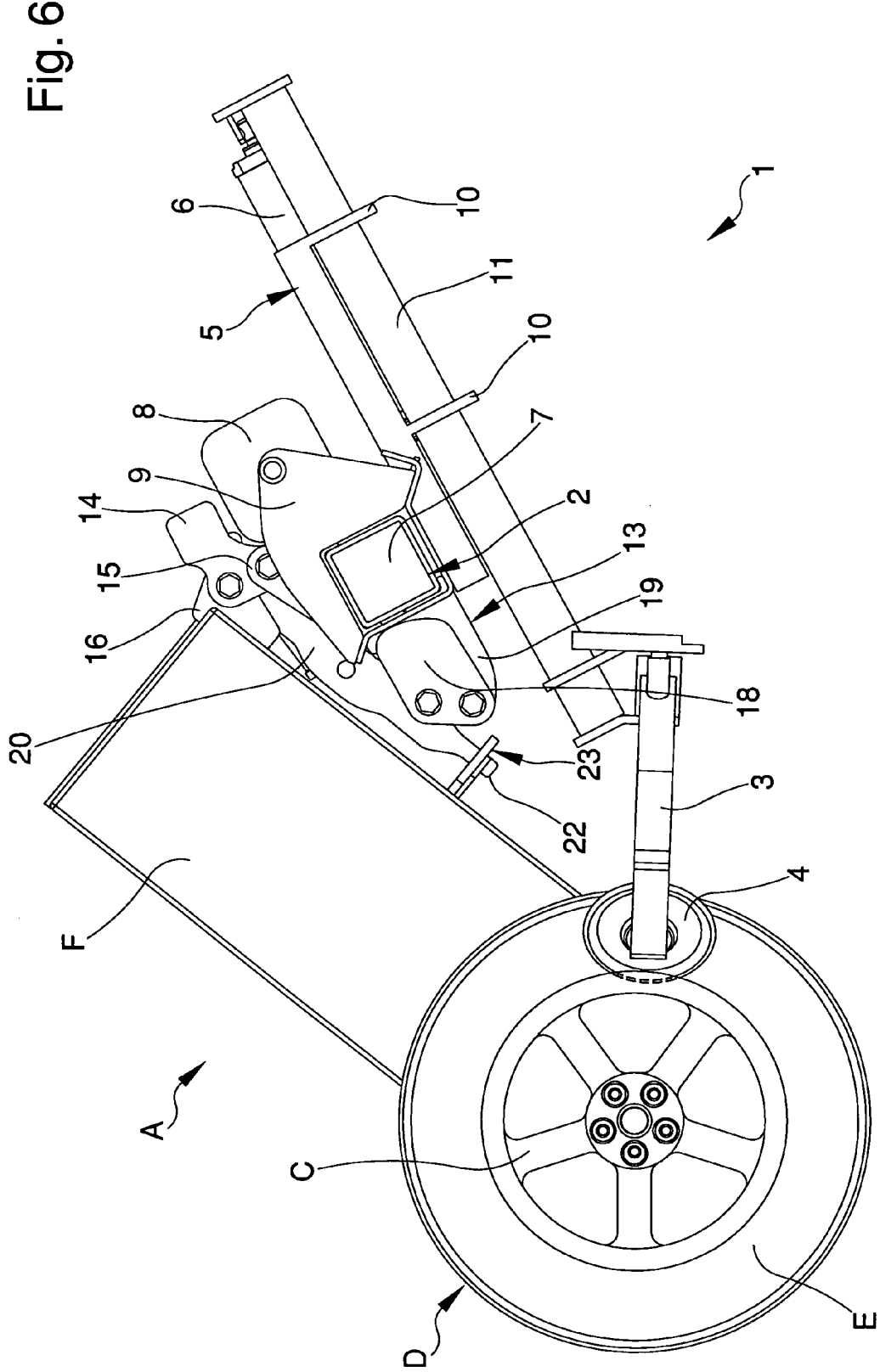
Figure 8:
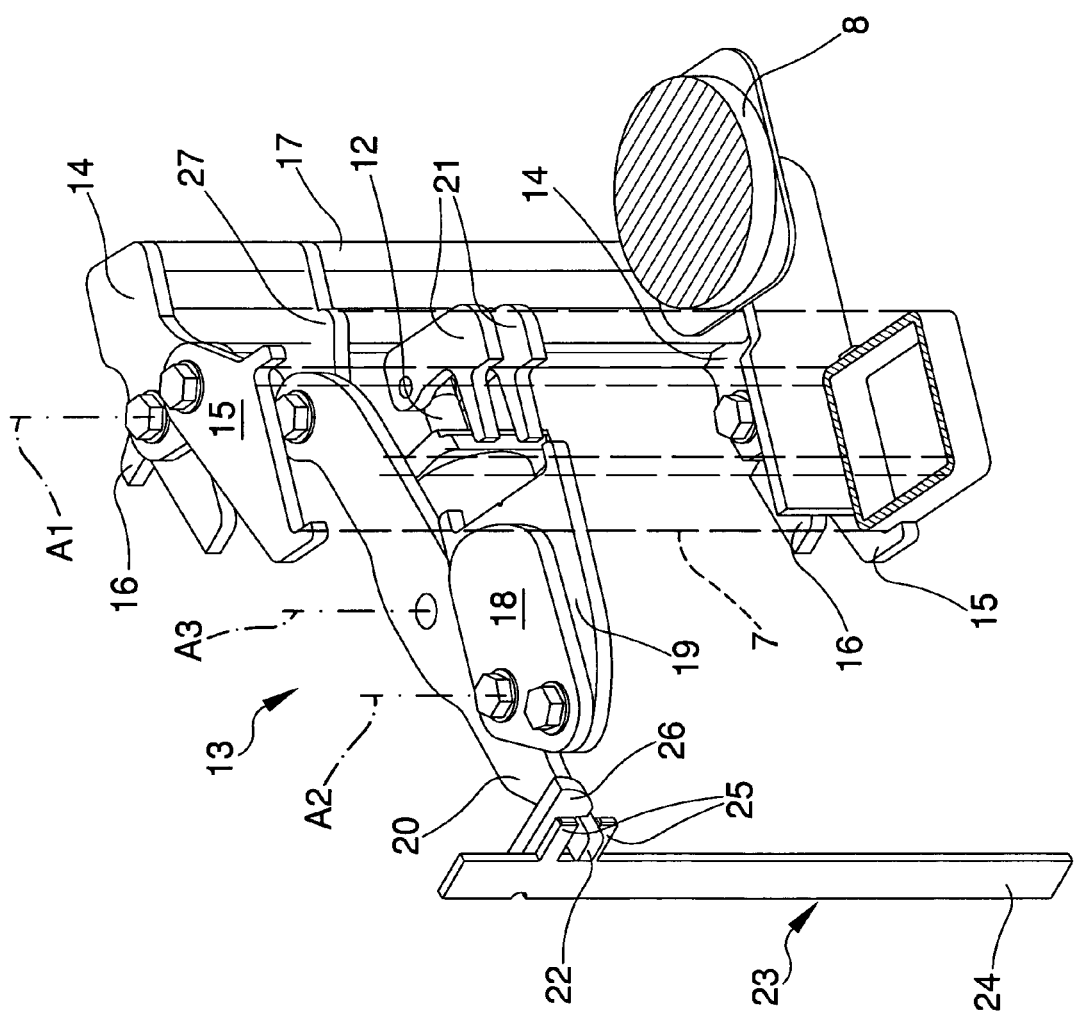

Subsequently, the wheel D is made to rotate by the grip and rotation device B, the third linear actuator 12 extends and the system of levers 13 guides the rotation of the upright 7, bringing the beading tool 4 from the first extreme position to the second extreme position (FIGS. 5, 6 and 8).

This way, the beading tool 7 moves along a substantially curvilinear trajectory and further approaches the rim C, inserting itself underneath the edge of the rim itself and ensuring the detachment of the bead of the tire E along the entire perimeter.

Advantageously, during such movement along the curvilinear trajectory and in correspondence to the section of the tire E pressed by the beading tool 4, the instantaneous speed of the beading tool 4 has substantially the same direction as the instantaneous speed of rotation of the tire E.

This means that, to a certain extent, it is the tire E itself which, being in rotation, drags the beading tool underneath the edge of the rim C.

Consequently, the action conveyed by the third linear actuator 12 requires a reduced power with respect to that of an actuator which, as in the known state of the art, moves a beading tool along a rectilinear direction.

Furthermore, the movement of the beading tool partially follows the rotation of the wheel D, restricting to the utmost the tensions of the tire E due to the pressure of the beading tool itself.

It has in point of fact been ascertained how the described invention achieves the proposed objects.

In particular, the fact is underlined that the unit for beading tires according to the invention allows more effective tire beading and restricts to the utmost the tensions on the tire due to the pressure of the beading tool.

Furthermore, the unit for beading tires according to the invention allows overcoming the mentioned drawbacks of the state of the art within the ambit of a simple, rational, easy, effective to use and low cost solution.

The invention claimed is:

1. A unit for beading tires in tire changing machines or the like, comprising at least a bearing structure associable with a tire changing machine or the like, at least a supporting element associated with said bearing structure and moving with respect to the rim of a wheel mounted on said tire changing machine, a first actuator arrangement for moving said supporting element on said bearing structure, and at least a beading tool associated with a free extremity of said supporting element, further comprising a second actuator arrangement and a transformation arrangement for transforming the movement generated by said second actuator arrangement in the translation movement of said beading tool along a substantially curvilinear trajectory between a first extreme position, in which said beading tool is substantially retracted with respect to said rim, and a second extreme position, in which said beading tool is substantially closer with respect to said rim, wherein said bearing structure is associated with said transformation arrangement and can be turned with respect to said rim for the translation of said beading tool between said first extreme position and said second extreme position, wherein said transformation arrangement comprises at least a system of levers associated with said second actuator arrangement and associated with said bearing structure, and wherein said system of levers comprises at least a first connecting rod having a first extremity hinged to said bearing structure and a second extremity turnable around a first rotation axis which is fixed with respect to said rim.

2. The unit according to claim 1, wherein said bearing structure comprises a first guide arrangement for the sliding of said supporting element along at least a first direction towards and away from said rim.

3. The unit according to claim 2, wherein said first actuator arrangement comprises a first linear actuator associated with said supporting element and which can be operated for sliding the supporting element itself along said first guide arrangement.

4. The unit according to claim 1, wherein said bearing structure comprises a second guide arrangement for sliding said supporting element along at least a second direction substantially parallel to the rotation axis of said rim.

5. The unit according to claim 4, wherein said first actuator arrangement comprises at least a second linear actuator associated with said supporting element for sliding the supporting element itself along said second guide arrangement.

6. The unit according to claim 1, wherein said first extremity of the first connecting rod is hinged to at least a first bracket fixed to said bearing structure.

7. The unit according to claim 1, wherein said second extremity of the first connecting rod is hinged to at least a second bracket fixed to said tire changing machine, in correspondence to said first rotation axis.

8. A unit for beading tires in tire changing machines or the like, comprising at least a bearing structure associable with a tire changing machine or the like, at least a supporting element associated with said bearing structure and moving with respect to the rim of a wheel mounted on said tire changing machine, a first actuator arrangement for moving said supporting element on said bearing structure, and at least a beading tool associated with a free extremity of said supporting element, further comprising a second actuator arrangement and a transformation arrangement for transforming the movement generated by said second actuator arrangement in the translation movement of said beading tool along a substantially curvilinear trajectory between a first extreme position, in which said beading tool is substantially retracted with respect to said rim, and a second extreme position, in which said beading tool is substantially closer with respect to said rim, wherein said bearing structure is associated with said transformation arrangement and can be turned with respect to said rim for the translation of said beading tool between said first extreme position and said second extreme position, wherein said transformation arrangement comprises at least a system of levers associated with said second actuator arrangement and associated with said bearing structure, and wherein at least a second connecting rod with a first extremity hinged to said bearing structure and a second extremity turnable around a second rotation axis which is fixed with respect to said rim.

9. The unit according to claim 8, wherein said first extremity of the second connecting rod is hinged to at least a third bracket fixed to said bearing structure.

10. The unit according to claim 8, wherein said second extremity of the second connecting rod is hinged to at least an anchoring element associated with said tire changing machine, in correspondence to said second rotation axis.

11. A unit for beading tires in tire changing machines or the like, comprising at least a bearing structure associable with a tire changing machine or the like, at least a supporting element associated with said bearing structure and moving with respect to the rim of a wheel mounted on said tire changing machine, a first actuator arrangement for moving said supporting element on said bearing structure, and at least a beading tool associated with a free extremity of said supporting element, further comprising a second actuator arrangement and a transformation arrangement for transforming the movement generated by said second actuator arrangement in the translation movement of said beading tool along a substantially curvilinear trajectory between a first extreme position, in which said beading tool is substantially retracted with respect to said rim, and a second extreme position, in which said beading tool is substantially closer with respect to said rim, wherein said second actuator arrangement comprises at least a third linear actuator having a first extremity hinged to said bearing structure and a second extremity turnable around a third rotation axis which is fixed with respect to said rim.

12. The unit according to claim 11, wherein said first extremity of the third linear actuator is hinged to at least a fourth bracket fixed to said bearing structure.

13. The unit according to claim 11, wherein said second extremity of the third linear actuator is hinged to at least an anchoring element associated with said tire changing machine, in correspondence to said third rotation axis.

14. The unit according to claim 13, wherein said anchoring element has a first extremity associated turnable with said tire changing machine and a second extremity associable with a locking device which are fixed with respect to said rim.

15. The unit according to claim 14, wherein said locking device comprises at least a hook for gripping said second extremity of the anchoring element.

16. A unit for beading tires in tire changing machines or the like, comprising at least a bearing structure associable with a tire changing machine or the like, at least a supporting element associated with said bearing structure and moving with respect to the rim of a wheel mounted on said tire changing machine, a first actuator arrangement for moving said supporting element on said bearing structure, and at least a beading tool associated with a free extremity of said supporting element, further comprising a second actuator arrangement and a transformation arrangement for transforming the movement generated by said second actuator arrangement in the translation movement of said beading tool along a substantially curvilinear trajectory between a first extreme position, in which said beading tool is substantially retracted with respect to said rim, and a second extreme position, in which said beading tool is substantially closer with respect to said rim, wherein, in correspondence to the section of the tire of said wheel suitable for being pressed by said beading tool during removal, the instantaneous speed of said beading tool during the translation from said first extreme position to said second extreme position has substantially the same direction as the instantaneous speed of rotation of said wheel mounted on the tire changing machine.

* * * * *